Jan. 18, 1944.     H. J. ENGH     2,339,258
BEARING KNOCK-OUT TOOL
Filed Aug. 9, 1941
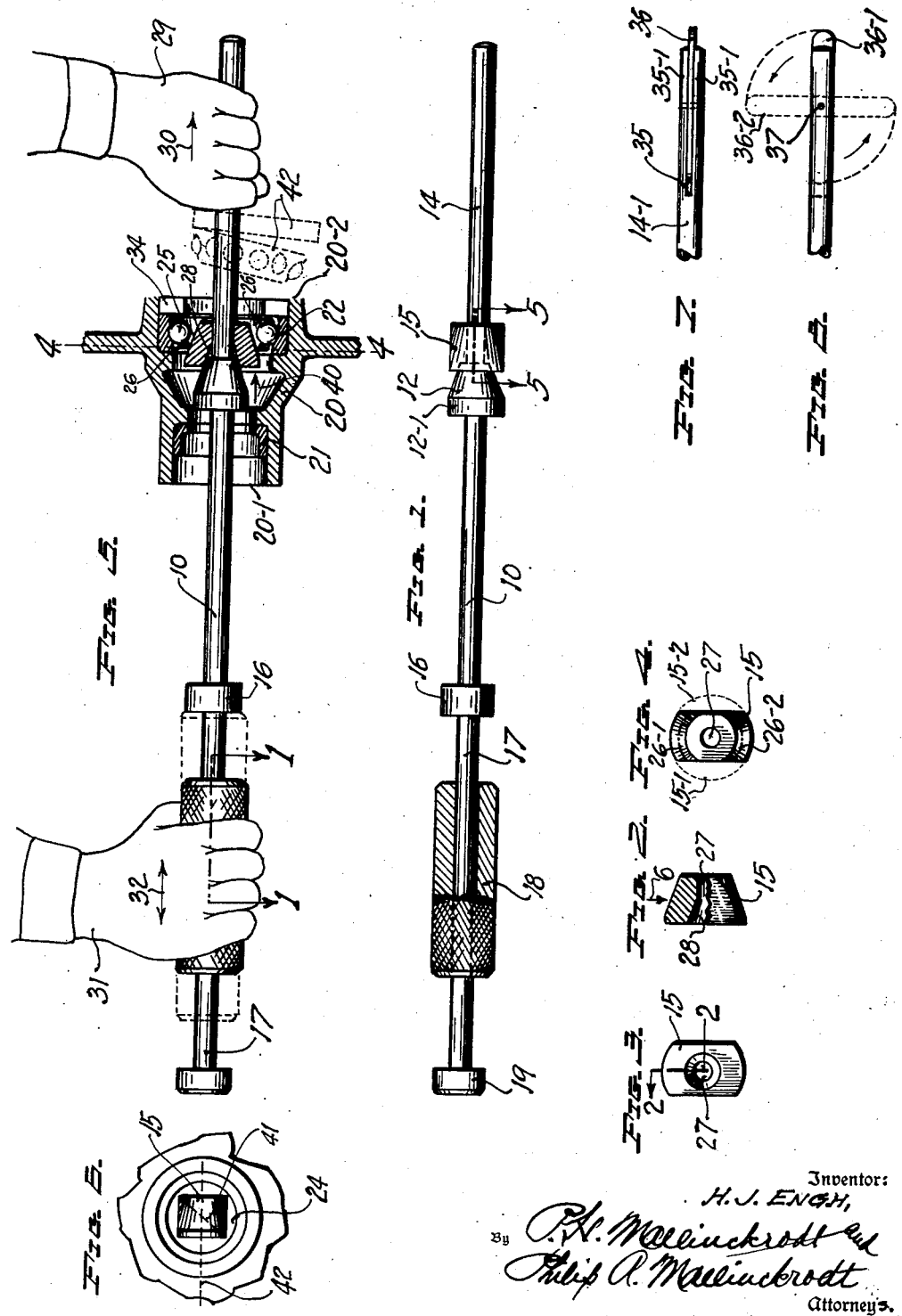
Inventor:
H. J. ENGH,
By P. H. Mallinckrodt
Philip A. Mallinckrodt
Attorneys.

Patented Jan. 18, 1944

2,339,258

UNITED STATES PATENT OFFICE 2,339,258

BEARING KNOCKOUT TOOL

Howard J. Engh, Salt Lake City, Utah

Application August 9, 1941, Serial No. 406,153

3 Claims. (Cl. 29—88.2)

This invention relates to a bearing knock-out tool, and more particularly to a tool of that description when applied to anti-friction bearings, for example, ball bearings or taper roller bearings, such as are used in the front wheels of automotive vehicles.

The principal objects of the invention are to provide a tool which shall:

First. Be simple, durable and relatively inexpensive.

Second. Catch the knocked-out bearing parts "on the fly" or in transit, to prevent them from landing on the ground.

Third. Have the knock-out force applied to the bearing uniformly around its circumference.

Fourth. Be applicable to bearing parts which ordinarily are not readily accessible.

Various kinds of bearing knock-out tools are in everyday use, but all such tools with which I have worked are open to the objection that certain parts of a bearing, after being loosened, are allowed to drop onto a dirty floor or upon the ground. It is well known that greasy bearing parts when so treated pick up all kinds of sand and grit particles, and, while it may be argued that such particles may easily be washed off, it has been my experience that no matter how carefully the bearing parts are washed, minute abrasive particles always remain, and when the bearing is again assembled, begin a cutting action which rapidly deteriorates or even destroys the bearing. Many of the tools in everyday use require the user to hold the tool with one hand and to strike it with another tool, such as a hammer, held in the other hand, both hands being located on the same side of the point where the tool contacts the bearing part.

In the present device I make use of an extension which passes through the bore of a bearing and protrudes to a considerable distance on the far side thereof, thereby providing a catching member for any parts expelled from the bearings, and at the same time leaves one hand of the user free to grip the extension, thereby preventing expelled bearing members from sliding off and at the same time making possible a balanced control of the tool.

An important part of the invention is a removable knock-out head by means of which bearing parts located in remote recesses of a wheel are rendered readily accessible.

In the drawing, which illustrates one embodiment of the invention,

Fig. 1 represents a plan, partly in section, the section being taken on the line 1—1 in Fig. 5;

Fig. 2, a side elevation of the removable knock-out head, partly in section, the section being taken on the line 2—2 in Fig. 3;

Fig. 3, an end elevation, viewed from the left in Fig. 2;

Fig. 4, an end elevation, viewed from the right in Fig. 2;

Fig. 5, a side elevation corresponding to Fig. 1, but showing in addition a wheel hub in which the tool of the invention is positioned ready for operation, the removable knock-out head being shown in section taken on the line 5—5 in Fig. 1;

Fig. 6, an end elevation of the wheel hub in Fig. 5 viewed from the left; and showing the manner in which the removable knock-out head is passed through the constricted bore of the hub;

Fig. 7, a plan showing an optional auxiliary detail; and

Fig. 8, a side elevation corresponding to Fig. 7.

Referring to the drawing, the numeral 10 indicates an elongated member, for example, a rod having advantageously a circular cross-section. Located at a suitable point along the rod is a stationary knock-out head 12, this head being preferably made of relatively soft metal such as brass, securely fixed on the rod 10, for example, by brazing. The shape of the fixed head 12 may conveniently be that of a cone frustum having, optionally, a cylindrical portion 12—1 below the base thereof. Extending a considerable distance beyond the small base of the cone frustum is a pilot or guide 14, for a purpose presently to be explained. The pilot forms an extension of the rod 10, and, therefore, both may be included in the single term "rod." In the latter circumstance, the knock-out abutment or head 12 is secured intermediate the ends of the rod, extended as the rod is by the pilot.

Loosely slidable on the pilot 14 and easily separable therefrom, is a removable or portable knock-out head 15. The shape of the portable knock-out head follows approximately that of the stationary head 12, being basically and advantageously that of a cone frustum. In the case of the portable head, however, side portions 15—1 and 15—2 are sliced off therefrom, preferably in such a manner as to define two opposite faces substantially parallel to the cone axis, as shown in Figs. 3 and 4. When the portable head is viewed as directed by the arrow 8 in Fig. 2, it has the appearance indicated at 15 in Figs. 1 and 6.

In Fig. 6, the diagonal line 41 which is transverse to the cone axis 42, is the largest dimension that can be drawn through the portable head. It is to be noted that this dimension is less than the diameter of the opening or bore 24. Therefore, the head 15 can be passed through the bore 24.

Spaced apart from the larger base of the fixed head 12 is an anvil member 16 secured to the rod 10, for example by welding. Extending beyond the anvil is a rod portion 17 which carries a hammer 18 freely slidable thereon. The length of the extension 17 is designed to give the hammer sufficient travel for forcibly striking the anvil 16, and the hammer 18 may be kept from sliding off by means of a stop collar 19.

The manner of using the tool will now be explained. In this instance, a wheel hub 20, Fig. 5, fitted, for example, with two ball bearings as usual, an outer one and an inner one, is taken as the subject to be operated upon. Only the cup 21 of the outer bearing, and the cup 22, cage 26, balls 25 and grease retainer 34 of the inner bearing, are shown, other parts of the bearings having been previously removed. It remains to eject the cage 26 with the contained balls 25 and the tightly held grease retainer 34, from the more or less inaccessible recess of the hub. The outside face of the hub, that is to say, the face turned away from the vehicle (not shown), is indicated at 20—1, and the inside face of the hub, at 20—2.

The bearing parts just mentioned, are ejected by applying an adequate force acting in this instance, in the direction of the arrow 40, Fig. 5, against the cage 26. In order to prevent distortion of the parts, the force must be equalized around the circumference of the cage. This equalization is attained by causing the portable head to contact the cage 26 along two arcs 26—1 and 26—2, Fig. 4, these arcs lying in a plane such as 4—4, in Fig. 5. The diameter of the circle of which the arcs 26—1 and 26—2 are parts, is greater than the diameter of the bore 24 through which the portable head 15 must pass.

The manipulation of the invention in effecting the ejection of the parts as just described, is as follows: The first step is to slip the head 15 off the member 14, and to pass this head through the bore 24 into the inner recess of the hub, as previously explained. Next, the head 15 is turned and seated in the cage, approximately in the position shown in Fig. 5. The pilot portion 14 of the rod is now passed through the bore 24 and is pushed into the head 15. The pilot 14 serves as a guide for conducting the stationary head 12 to its seat in the conical counterbore 28 of the portable head 15 as indicated in Fig. 5.

After the tool has been placed as just described, the user with one hand at 29, the left one in this instance, holds the tool seated by forcing it in the direction of the arrow 30, while at the same time, with his other hand at 31, the user reciprocates the hammer 18, as indicated by the double-pointed arrow 32, with sufficient striking force against the anvil 16 until the cage 26 and the grease retainer 34 are ejected from the hub 20 and precipitated onto the pilot 14, which acts as a catching member, approximately as indicated by the dotted lines at 42.

The user has a balanced control of the tool because it is grasped by two hands at points spaced sufficiently far apart from each other, with the two knock-out heads 12 and 15 positioned intermediate the two hands.

Ordinarily the user's hand is a satisfactory stop for the parts ejected from a bearing, but if it becomes desirable to have a mechanical stop, the construction shown in Figs. 7 and 8 advantageously fills the need. Since there can be no obstruction to the travel of the portable head 15 along the pilot, any mechanical stop must be movable out of the way.

In Figs. 7 and 8, the pilot 14—1 is slotted, as at 35, and in the slot is a stop-blade 36 pivoted at 37. An end portion 36—1 of the blade projects beyond the slot 35, this allowing the blade to be pushed out into the position 36—2. The slot divides the catching member into two parts 35—1, and these advantageously grip the blade 36 and frictionally hold the blade either in the full-line position or the dotted position.

In general, the portable knock-out head may be said to have two principal diameters or axes, a major and a minor, lying in planes transverse to each other. The major diameter is greater than, and the minor diameter less than, the diameter of a given opening. The portable head is disposed to have motion along the longitudinal axis of a pilot guide. Advantageously, as in the present instance, the major diameter of the portable head is perpendicular to the pilot axis, and the minor diameter of the portable head lies in a plane which contains the pilot axis. In use, the portable head is engaged by the pilot along which it slides until it strikes the stationary head, the latter forming an abutment to bear against the portable head when the latter is driven against an obstruction.

The stationary knock-out head 12 may be used directly for bearing parts having diameters within its range, and where it is not necessary for the head to first pass through an opening having a diameter less than that range.

While a specific embodiment of the invention is herein shown and described, minor changes can be readily made without departing from the scope of the following claims.

Having fully described my invention what I claim is:

1. A knock-out tool, including in combination, a rod; a knock-out abutment secured to the rod; a removable knock-out head adapted to be positioned on the rod in contact with the said knock-out abutment, said removable knock-out head being longer than it is thick or wide, and its length extending transversely of its mounting axis, so that, when removed from the rod, it can be inserted lengthwise through restricted passage means leading to an apertured element to be knocked out of place, but so that, when thereafter positioned on the rod, its length extends transversely across the aperature of the said element, and its ends abut firmly against the said element, serving to knock the said element out of place when impact is applied to the rod; and a pilot member extending from that portion of the rod which is adjacent the removable knock-out head, the said pilot member forming a longitudinal extension of the rod and serving to substantially balance the tool and to catch the apertured element as it is knocked out of place by the removable knock-out head.

2. A knock-out tool, including in combination, a rod; a knock-out abutment secured to the rod; and a removable knock-out head adapted to be positioned on the rod in contact with the said knock-out abutment, said removable knock-out head being longer than it is thick or wide, and its length extending transversely of its mounting axis, so that, when removed from the rod, it can be inserted lengthwise through restricted passage means leading to an apertured element to be knocked out of place, but so that, when thereafter positioned on the rod, its length extends transversely across the aperature of the said element, and its ends abut firmly against the said element, serving to knock the said element out of place when impact is applied to the rod, the removable knock-out head being in the shape of a cone frustrum having two opposite portions sliced off symmetrically about the cone axis in planes which are substantially parallel with the cone axis, the mounting axis being coincident with the cone axis.

3. A knock-out tool, including in combination, a rod adapted to pass freely through the aperture of an apertured element to be knocked out of place; a knock-out abutment secured to the rod intermediate its ends; and a removable knock-out head adapted to be positioned on one end portion of the rod and to slide along the rod into contact with the said knock-out abutment, said removable knock-out head being longer than it is thick or wide, and its length extending transversely of its mounting axis, so that, when removed from the rod, it can be inserted lengthwise through restricted passage means leading to said apertured element, but so that, when thereafter positioned on one end portion of the rod and slid into contact with the said knock-out abutment, its length extends transversely across the said aperture of the apertured element, and its ends firmly abut against the said apertured element, serving to knock the said apertured element out of place when impact is applied to the rod, that end portion of the rod which is opposite the end portion to which impact is applied serving to catch the ejected apertured element, the removable knock-out head being in the shape of a cone frustrum having two opposite portions sliced off symmetrically about the cone axis in planes which are substantially parallel with the cone axis, the mounting axis being coincident with the cone axis.

HOWARD J. ENGH.